Aug. 18, 1953  R. M. WOODS  2,649,379
CAKE BAKING AND TENDERIZING PROCESS
Filed Oct. 27, 1951  2 Sheets-Sheet 1
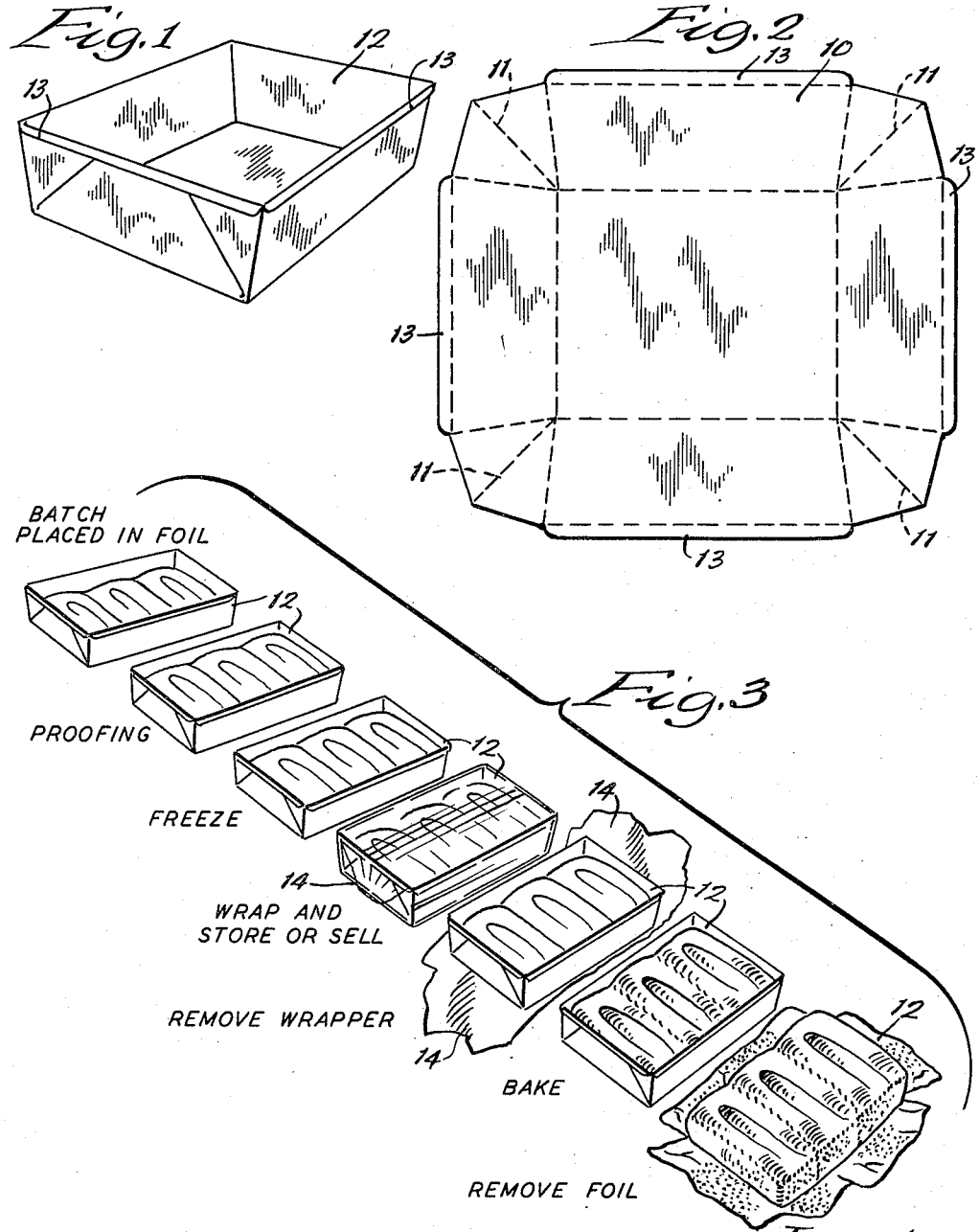

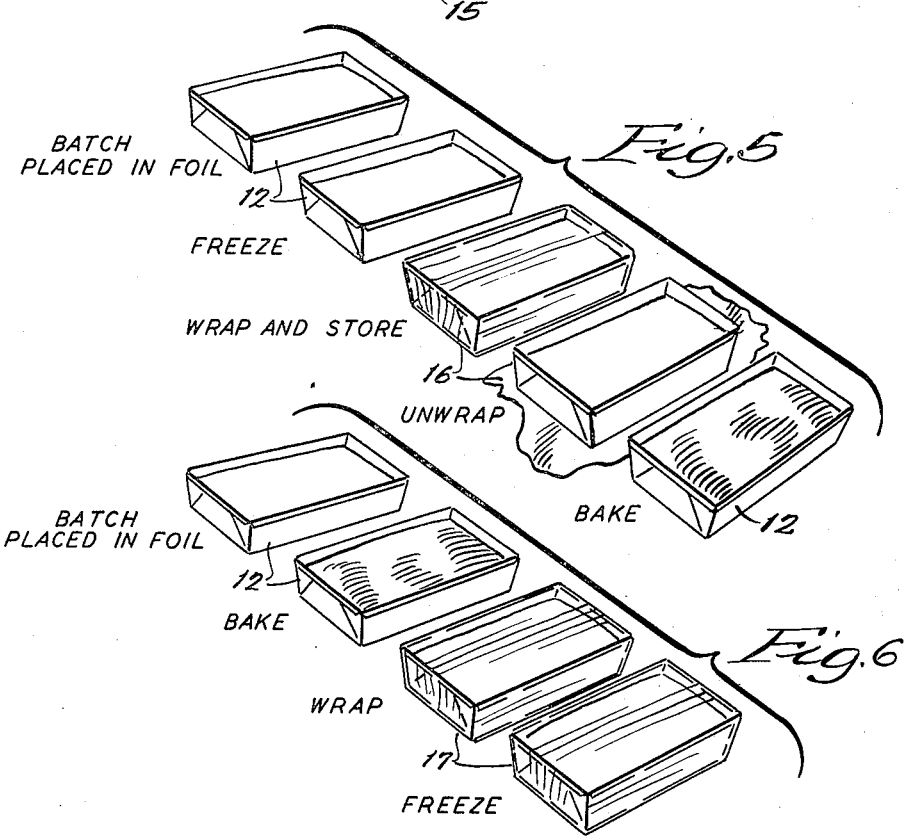

Patented Aug. 18, 1953

2,649,379

UNITED STATES PATENT OFFICE 2,649,379

CAKE BAKING AND TENDERIZING PROCESS

Robert M. Woods, Skokie, Ill.

Application October 27, 1951, Serial No. 253,497

6 Claims. (Cl. 99—192)

This invention relates to an aluminum foil baking method. The invention relates more particularly to the wrapping of baking batches in frangible aluminum foil for the baking of batches within the wrappers and thereafter wrapping or otherwise merchandising the baked batch while still in the foil. In some instances it may also be desirable to freeze the baking batch or bake within its wrapper, in all cases avoiding the use of grease, oils, etc. The invention has particular application to the baking of sweet goods containing a relatively high grease content as distinguished from foam cakes such as angel food and sponge, and will hereafter be referred to generally as "grease-cake."

The present application is a continuation-in-part of my co-pending application, Serial No. 48,717, filed September 10, 1948, now abandoned, for Aluminum Foil Wrapper Baking Process.

It is the practice today to bake yeast doughs and batters to produce rolls, cakes, cookies, etc., in heavy containers or pans formed of steel, aluminum, and other metals which are of sufficient strength to enable them to stand long usage. These heavy containers are greased, oiled, or provided with paper liners, used in place of grease or oil, etc., and after use the containers are usually cleaned before again being used for baking. Sometimes oiled or treated paper container liners are used. The grease, oil and liners are expensive and the foregoing steps require considerable labor, both with respect to treating the container before baking and for the removal of grease, etc. after baking. In any of the foregoing methods, whether the container be directly greased or equipped with a liner, the pans are re-used and have to be treated both before and after baking. Further, the use of grease or treated or oiled paper liners shortens the keeping qualities of the product because of the danger of the grease, etc. becoming rancid. Also, the practice of removing the bake from the pan and transferring it to another package results in the loss of valuable moisture and limits the freshness and keeping qualities of the product.

In the baking and shipping of cakes and like products, it is found that the baked product, no matter how carefully wrapped, tends to toughen and become dry after periods of storage and handling. Some cakes, such as fruitcakes, may be stored for a longer period of time without becoming too dry, but most cakes permit a minimum period of storage.

I have discovered that cakes can be prepared so as to retain their freshness and, in fact, the tenderness of the cake can be actually increased, through the use of certain treating steps. Further, the product can be stored for long periods of time without loss of freshness and without loss of the increased tenderness of the cake body.

An object of the present invention is to provide a process for the preparation and wrapping of cake, and the like, whereby the tenderness of the cake body is increased. A further object is to provide a process in which cake batter or the like is introduced into a flexible aluminum foil container and baked therein to form a seal between the contiguous portion of the cake and the foil, and thereafter merchandising the product while still in the foil container and either wrapped or unwrapped. Another object is to provide a process in which cake batter or the like is introduced into a flexible aluminum foil container and baked therein to form a seal between the contiguous portion of the cake and the foil and thereafter freezing the product. Yet another object is to provide a method for preparing bakery products in which the baking batch is enclosed within a frangible aluminum foil wrapper container and frozen or otherwise treated after the baking of the product, and the product stored in the container in which it is baked. A still further object is to provide a process in which a baking product containing sugar is baked within an aluminum foil container to seal the baked product to the container, the product being then frozen in sealed condition. Yet another object is to provide a method for preparing bakery products in which the baking batch is enclosed within a flexible or tearable aluminum foil container and frozen therein, the product being finally heated in its initial container and the flexible container stripped or torn therefrom. A further object is to provide a process for treating cake or the like immediately after cooking so as to chill the cake rapidly and then wrap the same. A still further object is to provide a process for baking cake and the like in which the baking is accomplished in a thin aluminum foil container and sealed and wrapped therein. Other specific objects and advantages will appear as the specification proceeds.

The invention is shown in illustrative embodiments by the accompanying drawings, in which—

Figure 1 is a perspective view of a foil wrapper or container; Fig. 2, a top plan view of a wrapper strip before bending the same into the shape of a container; Fig. 3, a schematic view showing in perspective steps employed in a process embodying my invention; Fig. 4, a view similar to Fig. 3 but illustrating a different series of steps; Fig. 5, a view similar to Fig. 3 but showing a variation in the method steps employed; and Fig. 6, another figure similar to Fig. 3 and illustrating a different series of steps employed in the method.

In one embodiment of my invention, the baking batch—dough or batter—is placed within an aluminum foil wrapper, which may be of any size or shape, and baked therein. The aluminum foil is preferably thin enough to tear or break when it is desired to strip the wrapper from the product. I have found aluminum foil of .008 weight to be very satisfactory. The foil is unlike paper in that it is sufficiently rigid to hold the batter or dough in any desired shape and without the use of any supporting pan structure, while at the same time being readily stripped from the bake, if this is desired. The aluminum foil wrapper containers may be of various sizes and shapes to be used in the baking of yeast bakery products and batters containing baking powder or baking soda, etc., as leavening agents. Any suitable weight of foil may be used, and such weight will vary depending upon the size and size of the batch unit.

Any suitable method for wrapping or enclosing the baking batch in the foil may be used. In the specific illustration given in Figs. 1 and 2, I start with a wrapper blank 10 which may be die cut from a strip of aluminum foil and, if desired, the blank may be formed with score lines 11 to facilitate folding. The die cut wrapper is then folded into the shape of the wrapper container 12, as shown in Fig. 1. This may be done by hand or by mechanical means. I prefer to equip the die cut wrapper 10 with marginal flanges 13 which are folded over the edge of the completed container for locking the folded parts in the relation shown in Fig. 1. Since the foil is readily frangible, this can be quickly accomplished. The foil, while readily manipulated, at the same time acts as a malleable body in retaining the position to which it is bent. Thus the finished wrapper 12, as shown in Fig. 1, is maintained in a relatively rigid condition for holding the batter or dough and for maintaining it in the desired shape, while, at the same time, the wrapper may be readily stripped from the baked goods, as will be later described.

By baking the batch of dough or batter in the wrapper container illustrated, I find that no grease whatever is required and no liner is employed. Instead, more effective baking is accomplished by the use of the foil wrapper alone. The thin aluminum foil permits quick heat transfer to the batch, producing a uniform browning of the product on its bottom, sides, and top. The baking operation tends to form a tight seal between the bake and the side walls so that moisture does not escape from the bake and the bake remains fresh over long periods of time. Since grease or greased liners are not employed, there is much less tendency for the product to become rancid after substantial periods and the product keeps its freshness for a longer period of time. The well-known and undesirable "bakery pan" odor and flavor are eliminated.

The dough or batter can be placed directly within the wrapper container and either baked; frozen and later baked; or baked and frozen. By wrapping in an air-proof wrapper or covering with a proper box or top, the product is ready for sale or shipment. The method does away with the use of grease, oil, liner papers, and oiled paper receptacles; it eliminates the use of heavy pans which have to be treated before baking and cleansed after baking. It provides a wrapper which is sealed to the bakery goods and it is effective in the quick transfer of heat evenly about the surfaces of the baking batch. The wrapper is malleable, retaining its shape and supporting the bake in any desired form, while still permitting stripping or dumping.

The method steps may be varied widely, as desired. In the illustration given in Fig. 1, the batch of dough, etc. for making rolls, such as, for example, pecan rolls, is placed in a wrapper container 12 and the rolls proofed to a desired degree. The proofing or partial raising of the rolls within the container 12 causes the rolls to tightly seal against the walls of the wrapper 12 so that the walls of the wrapper are utilized in sealing in the moisture within the rolls. If desired, the rolls may be completely baked. Caramel, etc. is placed in the bottom of the pan. In the specific process steps illustrated, the rolls are next frozen and wrapped with a cellophane or other air-proof wrapper 14 and the product may be sold in this form. The housewife, after purchasing the product, removes the wrapper 14, places the foil wrapper 12 within the oven and bakes the product, or if already baked, heats the same to melt the caramel. The wrapper 12 may then be stripped away, as shown in Fig. 3, or dumped to permit the removal of the rolls intact. The rolls may be inverted upon the dish so that the caramel and nut topping, etc. is retained on the tops of the rolls. The metal wrapper is effective in retaining the caramel, etc., about the tops of the rolls so that later, upon being inverted, the tops of the rolls are well saturated with the caramel, nuts, etc.

The foregoing method described in Fig. 3 is merely illustrative and may be employed for the baking of any other types of rolls, cakes, cookies and other dough and batter products.

In the illustration given in Fig. 4, batter is placed within the foil wrapper 12 and baked to form a cake. The cake is then wrapped in a cellophane or other air-proof wrapper 15, as illustrated in Fig. 4. When the product is sold in a bakery direct to the consumer, the cellophane or other air-proof wrapper may be dispensed with.

In Fig. 5, the batch is placed in a foil wrapper container as batter or dough, and frozen. The frozen material is wrapped in an air-proof container 16. Later, the wrapper 16 is removed and the batch is baked in an oven.

In another variation of the process, as illustrated in Fig. 6, the baking batch of dough or batter is placed in foil and baked. The batch within its wrapper is then wrapped in a second wrapper 17 of air-proof material and the product is frozen.

The foregoing sets out just a few of the many variations in the steps which may be employed for handling the baking batch or bake. In each of the operations, however, the thin wrapper provides a form which is relatively rigid for the baking and shipping operation and which preserves the baking batch or bake in the desired shape. At the same time, however, the wrapper may be stripped away, when desired, for the removal of the bake. It will be observed that no pan or support other than the foil wrapper itself is employed for baking the goods and the use of grease, oil, and paper, etc., liners is eliminated or avoided.

In the practice of the preferred process set out herein, the cake batter contains sugar or syrup material which, upon the baking of the cake, forms a tight caramel-like seal between the contiguous portions of the cake and the container, while at the same time the top of the cake becomes covered with a brown film forming a seal for the top of the cake. When the cake is placed within a refrigerator for quick freezing, it is found that the seal between the cake and the side wall remains effective under the cold temperatures to prevent moisture from leaving the cake and the moisture within the cake body is retained, the thin foil wall bringing about a quick transfer of cold to the interior of the cake. The freezing operation following the sealing of the cake within the container exerts a very beneficial effect upon the texture of the cake body, causing it to be more tender and palatable than the cake when originally baked. This tenderizing beneficial effect is believed to be due to the thin wrapper wall permitting the quick withdrawal of heat from the interior of a cake body while at the same time cooperating with the seal between the cake and the side wall of the foil in trapping moisture within the cake body and preventing the inflow of outside air. Whatever be the explanation, it is found that the combination of the sealing of the cake within the air-tight metal foil and the quick chilling of the interior of the cake body results in a tenderizing effect upon the cake, greatly increasing its palatability, etc.

I have found that when the cake or the like, immediately after baking, is subjected to quick chilling or freezing, not only is the cake made ready for immediate wrapping in a container for shipment, but also the quality of the cake in texture, moisture content and palatability, is considerably increased. Further, the results are enhanced when the chilling step is carried on with the cake in its original wrapper pan of thin metal foil, because the seal between the cake and the pan persists at this stage and prevents the escape of moisture and allows the cold to penetrate quickly into the interior of the cake body before there is an escape of moisture while also preventing the inflow of air into the cake body. The foil, having an extremely smooth surface due to the repeated rolling of the metal in the forming of the foil, enables the cake to be baked directly within the foil pan without the use of grease or paper liners, etc., while at the same time forming with the top portion of the cake an air-tight seal between the top portion of the cake having a brown sealing skin thereon and the adjacent side wall of the pan. The exclusion of air during the chilling operation, while transmitting the cold quickly through the thin foil into the body of the cake, brings about a change in the texture of the cake, rendering it more tender and palatable.

Among the many practical advantages resulting from the process disclosed herein, whether the product be baked in the foil wrapper and then sold or whether it be frozen before or after baking, is the fact that the process eliminates sources of contamination. At the present time when the baked product must be removed from the pan and thereafter wrapped, this procedure necessarily involves more handling of the product. When the product can be merchandised in the foil wrapper in which it was originally baked or frozen, there is no need for handling the product itself and therefore a more sanitary product reaches the consumer. These advantages are in addition to those which relate to the quality and freshness of the product due to the sealing in of the moisture and the elimination of "off odors" resulting from grease or other extraneous sources.

While in the foregoing specification, I have set forth certain details in structure and in steps as illustrating one or more embodiments of the invention, it will be understood that such details may be varied widely by those skilled in the art without departing from the spirit of my invention.

I claim:

1. In a cake-forming process of the character set forth, the steps of introducing a sugar-containing grease-cake batch into a wrapper pan formed of flexible thin aluminum foil having bottom and side walls, baking the batch to brown the top and sides thereof and to form a sealing syrupy substance between the contiguous portions of the cake and the pan to effect a seal therebetween, said baking producing a vapor within the cake saturated with the flavoring and aroma of a freshly-baked cake, then quickly freezing the cake while warm to condense said vapors upon the walls of said foil, and later heating said cake while still sealed within said wrapper pan to vaporize said condensed moisture and distribute said moisture throughout the cake body.

2. In a cake-forming process, the steps of introducing a sugar-containing grease-cake batch into a wrapper an formed of flexible, tearable aluminum foil having a bottom and side walls, baking the batch to effect a browning of the top and sides thereof and the forming of a syrupy seal between the contiguous portions of the cake and the wrapper pan, thereby trapping moisture saturated with the flavors and aroma of a freshly-baked cake within the cake body, and then quickly freezing the cake while warm to cause the bulk of said moisture to condense upon the chilled foil wrapper.

3. In a cake baking and tenderizing process, the steps of introducing a sugar-containing grease-cake batch into a wrapper pan formed of flexible thin aluminum foil having bottom and side walls, baking the batch to brown the top and sides thereof while producing a syrupy seal between the contiguous portions of the cake and the wrapper pan, thereby trapping within the cake body moisture saturated with the flavor and aroma of a freshly-baked cake, and then quickly freezing the cake while warm within said wrapper pan and with said seal intact to cause said moisture to condense upon the inner walls of the foil wrapper.

4. In a cake-forming process of the character set forth, the steps of introducing a sugar-containing grease-cake batch into a wrapper pan formed of flexible thin aluminum foil having bottom and side walls, freezing the cake batch while in said wrapper pan, baking the batch to brown the top and sides thereof and to form a sealing syrupy substance between the contiguous portions of the cake and the pan to effect a seal therebetween, said baking producing a vapor within the cake saturated with the flavoring and aroma of a freshly-baked cake, and then maintaining the product in the wrapper pan.

5. In a cake-forming process of the character set forth, the steps of introducing a sugar-containing grease-cake batch into a wrapper pan formed of flexible thin aluminum foil having bottom and side walls, baking the batch to brown the top and sides thereof and to form a sealing syrupy substance between the contiguous portions of the cake and the pan to effect a seal therebetween, said baking producing a vapor within the cake saturated with the flavoring and aroma of a freshly-baked cake, and then maintaining the baked product in the wrapper pan.

6. In a cake-forming process of the character set forth, the steps of introducing a sugar-containing grease-cake batch into a wrapper pan formed of flexible thin aluminum foil having bottom and side walls, baking the batch to brown the top and sides thereof and to form a sealing syrupy substance between the contiguous portions of the cake and the pan to effect a seal therebetween, said baking producing a vapor within the cake saturated with the flavoring and aroma of a freshly-baked cake, and then wrapping the baked product while still in said wrapper pan.

ROBERT M. WOODS.

References Cited in the file of this patent

UNITED STATES PATENTS

| Number | Name | Date |
|---|---|---|
| 1,411,223 | Retzbach | Mar. 28, 1922 |
| 2,058,662 | Broeg | Oct. 27, 1936 |
| 2,271,921 | Luker | Feb. 3, 1942 |

FOREIGN PATENTS

| Number | Country | Date |
|---|---|---|
| 439,603 | Great Britain | of 1935 |

OTHER REFERENCES

Scientific American, April 1941, page 239.

Cathcart et al.: Freezing as a Means of Retarding Bread Staling, I. & E. Chem., March 1939, pages 362–368.